United States Patent [19]

Kreyer et al.

[11] 4,158,224

[45] Jun. 12, 1979

[54] INVERTER APPARATUS

[75] Inventors: Lawrence Kreyer; Thomas G. Matherly, both of Santa Barbara, Calif.

[73] Assignee: Unilog Systems Corporation, Los Angeles, Calif.

[21] Appl. No.: 853,076

[22] Filed: Nov. 21, 1977

[51] Int. Cl.² .............................................. H02M 1/18
[52] U.S. Cl. ........................................ 363/56; 363/131
[58] Field of Search ................. 307/288, 313; 363/16, 363/20, 21, 24, 25, 131, 133, 134, 56

[56] References Cited

U.S. PATENT DOCUMENTS

| | | | |
|---|---|---|---|
| 3,492,496 | 1/1970 | Callan | 307/288 X |
| 3,506,846 | 4/1970 | Niemann | 307/313 X |
| 3,518,457 | 6/1970 | Herrmann et al. | 307/313 X |
| 3,585,407 | 6/1971 | Vinson | 307/313 X |
| 3,649,851 | 3/1972 | Cohen | 307/313 X |
| 3,725,679 | 4/1973 | Darrow | 307/288 X |
| 3,751,682 | 8/1973 | Howe | 307/313 X |
| 4,051,426 | 9/1977 | Wood | 363/131 |

*Primary Examiner*—William M. Shoop
*Attorney, Agent, or Firm*—Nilsson, Robbins, Dalgarn, Berliner, Carson & Wurst

[57] ABSTRACT

A method and an apparatus consisting of at least one inverter for converting a d.c. supply voltage to an alternating voltage for application across a load. More specifically, an inverter is disclosed consisting of two power darlington transistors having their collectors connected to an input of a load, a power supply having upper and lower supply voltage outputs connected to the emitters of the two transistors, and unique drive circuitry for alternately biasing each of the transistors on and off through control of their respective base terminals with voltages equal to or referenced to the upper and lower supply voltage outputs. The drive circuitry does not utilize transformers and incorporates circuitry which prevents simultaneous conduction of the two transistors. Also disclosed is an apparatus in which a separate inverter is connected across each of the three windings of a three phase synchronous motor, each inverter being controlled by a separate square wave clock pulse which is 120 degrees out of phase with the other two clock pulses.

25 Claims, 5 Drawing Figures

INVERTER APPARATUS

FIELD OF THE INVENTION

This invention relates to inverters, and more specifically to inverters utilizing switching transistors.

BACKGROUND AND SUMMARY OF THE INVENTION

Inverters have recently become available that utilize power darlington transistors having the capability to switch 20 amperes of current with control currents of 40 milliamperes. These transistors are commercially available in complementary pairs consisting of one pnp and one npn type. Circuits for controlling these transistors typically require both level shifting and amplification of control currents to levels sufficient to effect transistor switching. The most common devices used for this purpose are drive transformers because they can increase drive currents by the ratio of primary to secondary turns while simultaneously isolating the control circuits from the load. Major disadvantages that have been found with the use of transformers are their size, weight, electromagnetic interference (EMI) shielding requirements and high cost. This invention eliminates the above disadvantages by disclosing unique drive circuitry which does not require the use of transformers or any other load decoupling devices.

In accordance with the above, the invention discloses a method and an apparatus having at least one inverter for converting a d.c. voltage to an alternating voltage for application across a load, the inverter comprising a first transistor, a second transistor having its collector connected to the first transistor collector and to the load input, a d.c. power supply having an upper supply voltage output and a lower supply voltage output, the upper voltage output being connected to the first transistor emitter and the lower voltage output connected to the second transistor emitter, a means for alternately applying the upper voltage and lower voltage at the first and second transistor emitters, respectively, to the collector connection point, and a means for preventing simultaneous conduction of the first and second transistors.

In an embodiment in which the load return is reference to a voltage level between the upper and lower supply voltage output levels of the d.c. power supply, the first transistor will be a pnp type and have its emitter connected to the upper supply voltage and the second transistor will be an npn type and have its emitter connected to the lower supply voltage. The invention also discloses circuitry in which the first and second transistors are controlled through their respective base terminals by the upper and lower supply voltages and upper and lower reference voltages which are proportional to the upper and lower supply voltages.

Also disclosed is an apparatus for powering a three phase synchronous motor in which one inverter is used for each of the three motor windings. In this apparatus synchronism of the three inverters with respect to each other is maintained by the relative phasing of three input square wave clock pluse signals, each of which is phase-separated by 120 degrees from the other two.

DETAILED DESCRIPTION

As required, detailed illustrative embodiments of the invention are disclosed herein. These embodiments exemplify the invention and are currently considered to be the best embodiments for such purposes. However, it is to be recognized that modifications to the circuitry utilized to implement the principles of the invention can be made. Accordingly, the specific circuitry disclosed is representative in providing a basis for the claims which define the scope of the present invention.

As above indicated, the invention discloses an apparatus comprising at least one inverter which utilizes unique switching transistor drive circuitry to eliminate the need for transformers or other types of signal decouplers by referencing transistor drive signals to upper and lower supply voltage levels developed in a d.c. power supply. These upper and lower supply voltages are applied across the emitters of two transistors having their collectors connected to a load input. The upper and lower supply voltages are sequentially applied to the load by alternately causing each of the two transistors to be in a conducting and non-conducting state. The invention also discloses circuitry which prevents simultaneous conduction of the two transistors. Also disclosed is a unique d.c. power supply or voltage regulator which develops reference voltages utilized for control of the switching transistors.

Figure 1:
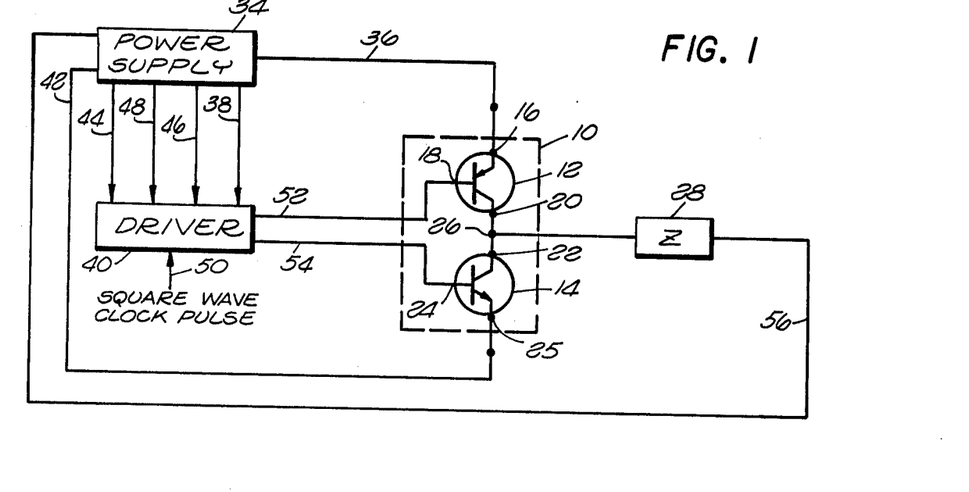
FIG. 1 is a block diagram of an apparatus according to this invention.

The supportive and operative elements of the invention can be seen in FIG. 1. A power output stage 10 is provided which consists of two power transistors, the first one 12 being of a pnp type and the second one 14 being of an npn type. The first transistor 12 has an emitter 16, base 18 and collector 20; the second transistor has a collector 22, base 24 and emitter 25. The first transistor 12 and second transistor 14 have their respective collectors 20 and 22 connected at a common point 26 which in turn is connected to the input of a load 28. A power supply 34 provides an upper supply voltage on two lines 36 and 38, the first line 36 being connected to the first transistor emitter 16 and the second line 38 being connected to a driver 40 to be described below. The power supply 34 also supplies a lower supply voltage on two lines 42 and 44, the first line 42 being connected to the second transistor emitter 25 and the second line 44 being connected to the driver 40. In addition, the power supply 34 also provides an upper reference voltage on a line 46 connected to the driver 40 and a lower reference voltage provided on a line 48 to the driver 40. The relationship of the upper supply voltage to the upper reference voltage and the lower supply voltage to the lower reference voltage will be explained hereinbelow.

A driver 40 receives a control signal input, which in the embodiments described below is a square wave clock pulse, on a control signal input line 50. The driver 40 also receives as inputs the upper supply voltage, lower supply voltage, upper reference voltage and lower reference voltage on their respective input lines 38, 44, 46 and 48. It provides a pnp drive signal output on one line 52 and an npn drive signal output on another line 54, the first line 52 being connected to the base 18 of the first transistor 12 and the second line 54 being connected to the base 24 of the second transistor 14. A load return line 56 is referenced back to the power supply 34. If the return line 56 is referenced to a voltage potential not greater than the upper supply voltage or less than the lower supply voltage as in the embodiments disclosed below, the first transistor 12 will be chosen to be a pnp type and the second transistor 14 will be chosen to be an npn type.

In operation, the driver 40, through the first transistor drive signal, biases the base electrode 18 of the first transistor 12 so that the transistor will either be conductive or non-conductive. Similarly, the second transistor drive signal biases the base electrode 24 of the second transistor 14 so that it will be either non-conductive or conductive. The two transistor drive signals are sequenced by circuitry to be explained below so that they will not cause simultaneous conduction of the two transistors 14 and 16. As one can appreciate, control of the first and second transistors 12 and 14 by their respective drive signals will cause the voltage potential at the common collector connection point 26 to alternate between that present at the first transistor emitter 16 and the second transistor emitter 25. It is this sequential switching of the two transistors which supplies an alternating voltage to the load 28 without any need for transformers or other signal decouplers.

Figure 2:
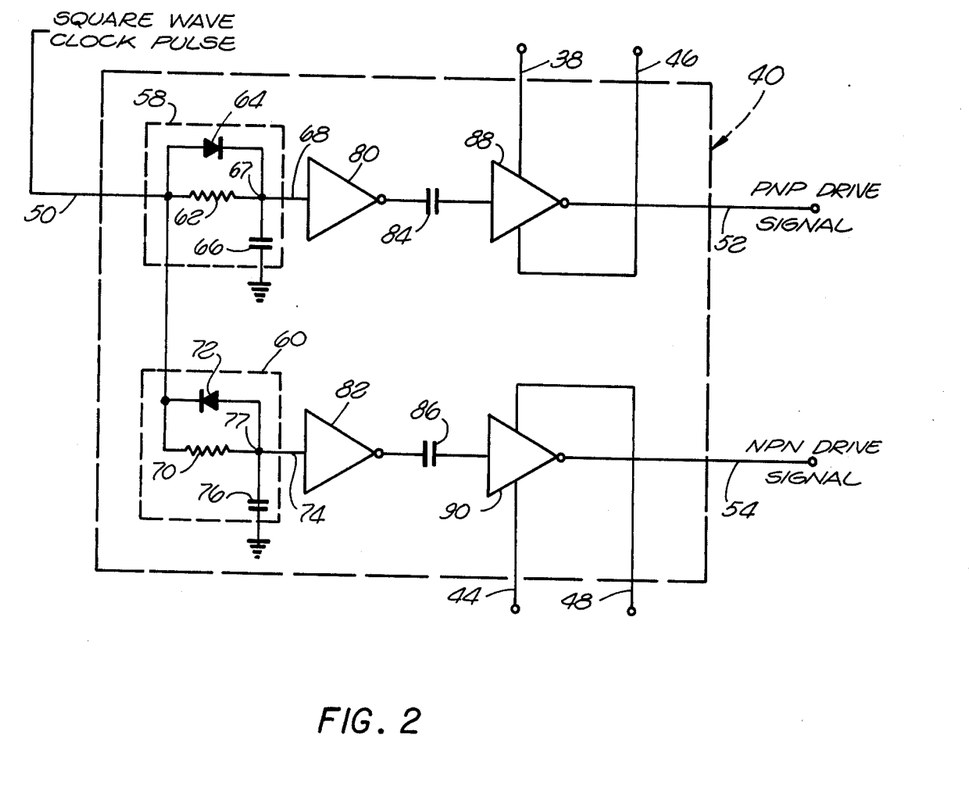
FIG. 2 is a circuit diagram of the driver which converts an input clock signal to power transistor drive signals.

A circuit diagram for the driver 40 is shown in FIG. 2. An input square wave clock pulse is supplied on the control signal input line 50. A first shaping network 58 consists of a resistor 62 in parallel with a diode 64, one end of the combination being connected to the control signal input line 50 and the other end connected to a first side of a capacitor 66 at an interconnection point 67, the second side of the capacitor 66 being connected to ground. The diode 64 is oriented so that it acts as a short circuit to the leading edge of the clock pulse input and as an open circuit to the trailing edge of the clock pulse input. As a result of this orientation, the signal on the first pulse shaping network 58 output line 68, which is connected to the diode 64 and capacitor 66 interconnection point 67, will be a pulse having a rise time equal to the rise time of the original clock pulse and a trailing edge decay time characteristic proportional to the time constant of the resistor 62 capacitor 66 (RC) combination. Similarly, a second pulse shaping network 60 consists of a resistor 70 in parallel with a diode 72, one end of the combination being connected to the control signal input line 50 and the other end connected to a first side of a capacitor 76 at an interconnection point 77, the second side of the capacitor 76 being connected to ground. However, in this case the diode 72 is oriented so that it acts as an open circuit to the leading edge of the clock pulse input and as a short circuit to the trailing edge of the clock pulse input. With the diode 72 oriented in this manner, the signal on the second pulse shaping network 60 output line 74, which is connected to diode 72 capacitor 76 interconnected point 77, will be a pulse having a trailing edge decay time equal to that of the original clock pulse and a leading edge rise time proportional to the time constant of the resistor 72, capacitor 76 (RC) combination.

A pnp sequencing control buffer 80 and an npn sequencing control buffer 82 are connected through respective level shifting capacitors 84 and 86 to their respective drive output buffers 88 and 90. The pnp drive output buffer 88 operates in accordance with timing to be described hereinbelow and sequentially applies the upper supply voltage and the upper reference voltage to its output line 52 which is connected to the first transistor base 18. Similarly, the npn drive output buffer 90 also sequentially applies the lower supply voltage and lower reference voltage to its output line 54 which is connected to the second transistor base 24.

Figure 3:
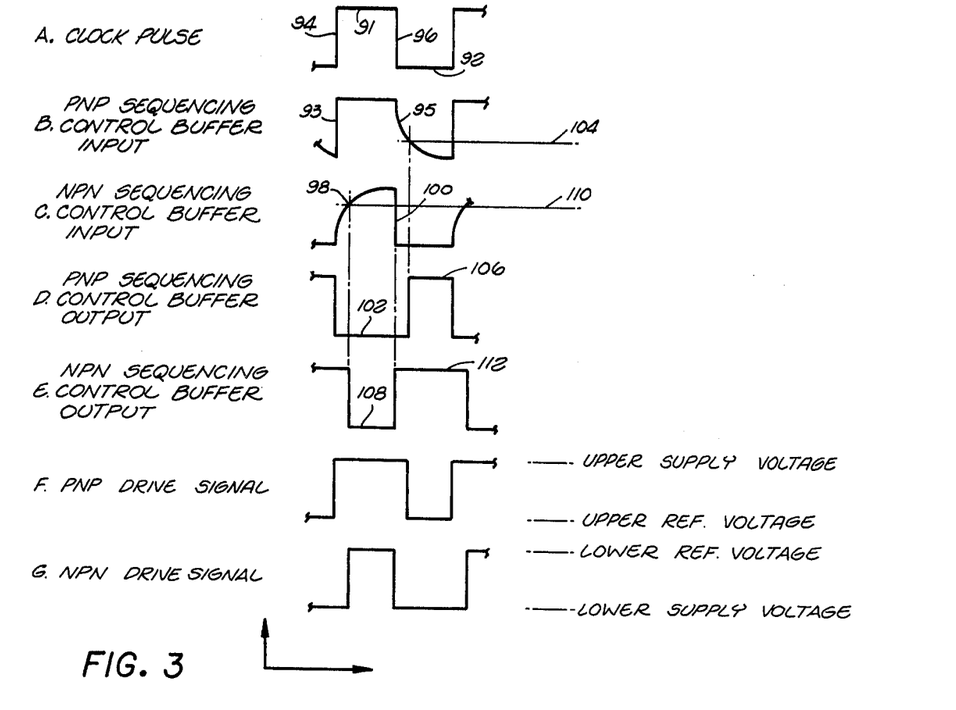
FIG. 3 shows wave forms present at various junctions within the driver shown in FIG. 2 and illustrates the time relationships between each of the various wave forms.

Operation of the driver 40 can be visualized by referring to the wave forms shown in FIG. 3 which have ordinates corresponding to voltage level and abscissas corresponding to time. The square wave clock pulse control signal appearing on its input line 52 is shown in FIG. 3A. It has an upper voltage level 91 and a lower voltage level 92, each of the voltage levels being of equal time duration. After the clock pulse is modified by the first pulse shaping network 58 in accordance with the above description, the wave form appearing on the pnp sequencing control buffer input line 68 is as shown in FIG. 3B. As previously explained, the leading edge 93 of the control buffer input is unchanged from that of the original clock pulse leading edge 94. However, due to the blocking action of the diode 64, the trailing edge 95 decays gradually and in proportion to the time constant of the resistor 62, capacitor 66 combination and does not have the short decay time associated with the clock pulse trailing edge 96. Similarly, the output wave form of the second pulse shaping network 60 which appears on the npn sequencing control buffer input line 74 is as shown in FIG. 3C. It has a leading edge rise time characteristic 98 which is determined in accordance with the resistor 70, capacitor 76 time constant as previously explained. However, due to the shorting action of the diode 72, the trailing edge 100 is unchanged with respect to the trailing edge 96 of the original clock pulse.

The pnp sequencing control buffer 80 supplies a two state output shown in FIG. 3D which is at a first lower potential 102 whenever the pnp sequencing control buffer input exceeds a voltage which is above a first predetermined level 104 as shown in FIG. 3B. Similarly, the pnp sequencing control buffer 80 has an output voltage which is at a second higher level 106 whenever its input voltage is equal to or below the first predetermined level 104. Thus, the wave shape at the output of the pnp sequencing control buffer 80 is an asymmetrical pulse as shown in FIG. 3D having a longer time duration at a lower voltage level 102 than at an upper voltage level 106. Similarly, the npn sequencing control buffer 82 provides an output as shown in FIG. 3E that is at a lower voltage level 108 when its input as shown in FIG. 3C exceeds a second predetermined upper voltage level 110 and an output that is at a higher voltage level 112 when its input is equal to or below the second predetermined voltage level 110.

At the output of each of the sequencing control buffers 80 and 82 is a level shifting capacitor 84 and 86, respectively. These capacitors remove any steady state d.c. biases at the output of the sequencing control buffers 80 and 82 thereby insuring that inputs to each of the drive output buffers 88 and 90 will be at a predetermined voltage levels.

The pnp drive signal provided by the pnp drive output buffer is shown in FIG. 3F. As one can see, the upper voltage level of the pnp drive signal corresponds to the upper supply voltage on line 38 and the lower voltage of the pnp drive signal corresponds to the upper reference voltage on line 46. Thus the pnp drive signal consists of a two-state digital signal having an upper and lower voltage level corresponding to the upper supply voltage and upper reference voltage respectively. However, because of the asymmetry of the pnp sequencing control buffer 80 output, as previously explained, the pnp drive signal from the pnp drive output buffer 88 is asymmetrical in that the time period during which the output voltage level corresonds to the upper supply voltage is greater than the time period during which it corresponds to the upper reference voltage. In a similar manner the npn drive output buffer 90 provides a two-state digital signal shown in FIG. 3G having voltage levels corresponding to the lower supply voltage and the lower reference voltage in accordance with the asymmetrical output signal from the npn sequencing control buffer 82 as shown in FIG. 3E. Thus the npn drive signal is also asymmetrical in shape in that the period during which the signal is at the lower reference voltage is shorter than the period during which it is at the lower supply voltage.

Figure 4:
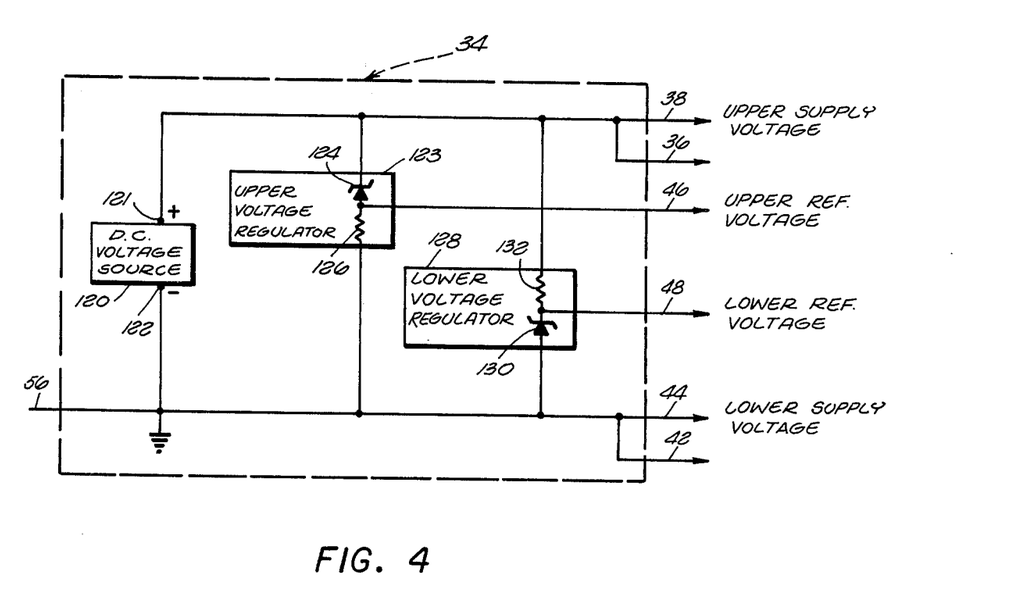
FIG. 4 is a block diagram showing the apparatus used for generating an upper reference voltage proportional to the upper supply voltage and a lower reference voltage proportional to the lower supply voltage.

The power supply 34 is shown in more detail in FIG. 4. A d.c. voltage source 120, which could be of any conventional type such as a battery, a full wave rectifier, etc., is connected so that a positive terminal 121 provides the upper supply voltage and a negative terminal 122, which is referenced to ground, provides the lower supply voltage. In the particular embodiment shown, the load return line 56 is also referenced to ground. However, as previously explained, the load return line 56 could be referenced to any voltage level, with the specific level chosen determinative of the type of transistors, i.e., npn or pnp, to be utilized in the power output stage 10. The upper reference voltage is derived from an upper voltage regulator 123 connected between the upper supply voltage line 38 and the lower supply voltage line 44. Although the actual voltage regulator utilized could be one of many different types, in this particular embodiment it comprises a voltage dropping zener diode 124 in series with a resistor 126, the combination being connected across the upper and lower supply voltage lines 38 and 44. The zener diode 124 is connected so that when current flows from the upper supply voltage line 38 to the lower supply voltage line 44, the breakdown voltage potential of the diode 124 is being exceeded, thereby resulting in a voltage drop from the upper supply voltage line 38 to the upper reference voltage line 46 which is constant and independent of the current flowing through the zener diode 124. Therefore one can appreciate that regardless of the loading on the upper reference voltage line 46, the voltage differential between the upper supply and upper reference voltages will remain substantially constant, thereby insuring that the two output voltages from the pnp drive output buffer 88 will remain constant. The lower reference voltage is developed in a similar manner through a lower voltage regulator 128. A zener diode 130 is again connected in series with a resistor 132, the combination being connected across the upper and lower supply voltage lines 38 and 44. The lower voltage regulator zener diode 130 is also connected so that its breakdown voltage potential is exceeded when current flows from the upper supply voltage line 38 to the lower supply voltage line 44. Again, this breakdown voltage potential remains substantially constant regardless of the current flowing through the diode and thereby provides a fixed voltage differential between the lower supply voltage line 44 and the lower reference voltage line 48.

In operation, the clock pulse shown in FIG. 3A enters the first pulse shaping network 58 and is modified to the shape shown in FIG. 3B as previously explained. The output of the first pulse shaping network 58, shown in FIG. 3B, enters the pnp sequencing control buffer 80 and is converted into a digital signal as shown in FIG. 3D wherein an upper voltage level 106 is established whenever the output of the first pulse shaping network 58 is equal to or below a first predetermined voltage 104 and a lower voltage level 102 established whenever it is above the predetermined voltage 104. The pnp sequencing control buffer 80 output as shown in FIG. 3D then passes through a level shifting capacitor 84 for removal any d.c. biases and enters the pnp drive output buffer 88. The pnp drive signal is generated as previously explained and consists of a two-state output signal as shown in FIG. 3F having voltages corresponding to either the upper supply voltage or the upper reference voltage.

In a similar manner, the square wave clock pulse also enters the second pulse shaping network 60 and is modified to the shape shown in FIG. 3C as previously explained. The npn sequencing control buffer 82 operates in a similar manner to the pnp sequencing control buffer 80 and, has an output as shown in FIG. 3E. The level shifting capacitor 86 is also provided to remove d.c. biases from the output of the npn sequencing control buffer 82 prior to its entering the npn drive output buffer 90. As can be seen from FIG. 3E, when the npn sequencing control buffer 82 output is low the npn drive signal at the output of the npn drive output buffer 90 corresponds to the lower reference voltage and whenever the npn drive control buffer output 90 is high the npn drive signal corresponds to the lower supply voltage. The npn drive signal output is shown in FIG. 3G.

Referring now to FIG. 1, the first transistor 12 will be biased to a non-conducting state whenever the voltage on the base electrode 18 is equal to the voltage at the emitter electrode 16 and will be in a conducting state whenever the voltage level on the base is below the potential at the emitter 16. Thus referring to FIG. 3F it can be seen that the first transistor 12 will be conducting during those time periods when the pnp drive signal corresponds to the upper reference voltage and will be non-conducting when the pnp drive signal corresponds to the upper supply voltage.

In a similar manner the second transistor 14 will be in a non-conducting state whenever the voltage on the base electrode 24 is equal to the voltage at the emitter electrode 25 and will be in a conducting state whenever the voltage level on the base electrode 24 is at a higher voltage than that on the emitter electrode 25. Thus by referring to FIG. 3G one can appreciate that the second transistor 14 will be in a conducting state during those times when the base electrode voltage 24 is at a level corresponding to the lower reference voltage and will be non-conducting when the base electrode is at a voltage level corresponding to the lower supply voltage. Thereby by referring to FIGS. 3F and 3G it can be seen that the second transistor 14 will be conducting for a period during which the npn drive signal 54 is at a level corresponding to the lower reference voltage and that the first transistor 12 will be conducting when the pnp drive signal 52 is at a level corresponding to the upper reference voltage. As has been previously explained, these two voltage levels will never overlap because of the delay between the time that one ends and the other begins. This delay, as previously explained, is due to time constants associated with the rise time of the leading edge of the npn sequencing control buffer 82 input shown in FIG. 3C, and the decay time of the trailing edge of the pnp sequencing control buffer 80 input as shown in FIG. 3B. It is these time constants and associated voltage level delays which ensure that the first and second transistors 12 and 14 will not conduct simultaneously.

Figure 5:
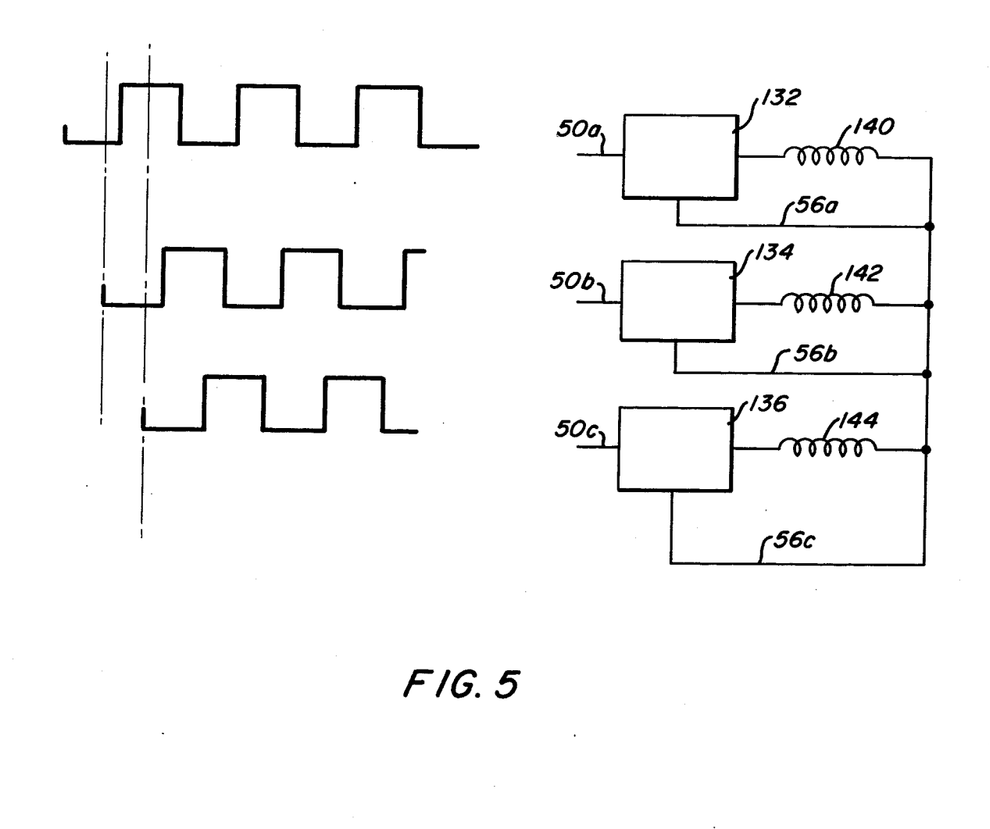
FIG. 5 is a block diagram of another embodiment of apparatus in accordance with the invention.

A further embodiment of the invention, shown in FIG. 5, provides for three identical circuits 134, 136 and 138 as above described having loads comprising three separate windings, as at 140, 142 and 144, of a synchronous motor. By creating three clock pulses each being 120° out of phase with each of the others, as shown in FIG. 5, which clock pulses may be provided through techniques well known in the digital art, a synchronous motor can be driven by a very simple clock pulse generating circuit which controls three of the above described inverters. In FIG. 5, control input lines 50a, 50b and 50c and load return lines 56a, 56b and 56c, there being one of each for each of the circuits, of course serve the same respective purposes as the input line 50 and the load return line 56 of FIG. 1.

We claim:

1. An apparatus having at least one inverter for converting a d.c. voltage to an alternating voltage for application across a load having an input and return referenced to said d.c. voltage, comprising:
   a first pnp type transistor having emitter, collector and base terminals;
   a second npn type transistor having emitter, collector and base terminals, said first transistor collector terminal being connected to said second transistor collector terminal and said load input being connected to said collector connection point;
   a d.c. power supply having an upper voltage output and a lower voltage output, said upper voltage output connected to said first transistor emitter and said lower voltage output connected to said second transistor emitter, said load return being referenced to a voltage potential not more than or less than said upper and lower voltage outputs, respectively;
   means for alternately applying said upper voltage output and said lower voltage output at said first and second transistor emitters respectively to said collector connection point, said applying means comprising means for controlling the conduction of said first and second transistors through their respective base terminals, said controlling means including:
   means for applying to said first transistor base terminal a blocking voltage equal to said upper voltage output and an unblocking voltage which is a predetermined voltage differential below said upper voltage output, said blocking and unblocking voltages causing said first transistor to not conduct and conduct, respectively, and
   means for applying to said second transistor base terminal a blocking voltage equal to said lower voltage output and an unblocking voltage which is a predetermined voltage differential above said lower voltage output, said blocking and unblocking voltages causing said second transistor to not conduct and conduct, respectively; and
   means for preventing a simultaneous conduction of said first and second transistors.

2. The apparatus of claim 1 in which said d.c. power supply further comprises a first voltage regulator connected across said upper voltage and lower voltage outputs, said first voltage regulator providing said first transistor unblocking voltage, and a second voltage regulator connected across said upper voltage and lower voltage outputs, said second voltage regulator providing said second transistor unblocking voltage.

3. The apparatus of claim 2 in which said first voltage regulator comprises a first zener diode and current limiting impedance in series, said first zener diode current blocking terminal being connected to said upper voltage output, said first transistor unblocking voltage being a voltage at the other terminal of said first zener diode when said first zener diode breakdown voltage is exceeded, and said second voltage regulator comprises a second zener diode and current limiting impedance in series, said second zener diode current blocking terminal being connected to said second current limiting impedance, said second transistor unblocking voltage being a voltage at said second zener diode current blocking terminal when said second zener diode breakdown voltage is exceeded.

4. An apparatus having at least one inverter for converting a d.c. voltage to an alternating voltage for application across a load having an input and return referenced to said d.c. voltage, comprising:
   a first pnp type transistor having emitter, collector and base terminals;
   a second npn type transistor having emitter, collector and base terminals, said first transistor collector terminal being connected to said second transistor collector terminal and said load input being connected to said collector connection point;
   a d.c. power supply having an upper voltage output and a lower voltage output, said upper voltage output connected to said first transistor emitter and said lower voltage output connected to said second transistor emitter, said load return being referenced to a voltage potential not more than or less than said upper and lower voltage outputs, respectively;
   means controlled by an externally generated repetitive square wave clock pulse having a leading edge and a trailing edge, for alternately applying said upper voltage output and said lower voltage output at said first and second transistor emitters respectively to said collector connection point, said applying means comprising means for controlling the conduction of said first and second transistors through their respective base terminals; and
   means for preventing a simultaneous conduction of said first and second transistors.

5. The apparatus of claim 4 in which said means for preventing simultaneous conduction comprises means delaying the conduction of said first transistor for a first predetermined time after cessation of conduction of said second transistor and delaying the conduction of said second transistor for a second predetermined time after cessation of conduction of said first transistor, said delaying means for the conduction of said first transistor being a first RC network having a time constant proportional to said first predetermined time, said square wave trailing edge decay characteristics being altered by said first RC network and said square wave leading edge rise characteristics being unaltered by said first RC network, said first transistor conducting during a time in which said so altered square wave is below a predetermined voltage level, and said delaying means for the conduction of said second transistor being a second RC network having a time constant proportional to said second predetermined time, said square wave leading edge rise characteristics being altered by said second RC network and said square wave trailing edge decay characteristics being unaltered by said second RC network, said second transistor conducting during a time in which said so altered square wave is above a predetermined voltage level.

6. The apparatus of claim 4 in which said at least one inverter comprises three inverters, each being driven by a separate repetitive square wave clock pulse being phase separated from the other two by about 120 degrees.

7. An inverter for converting a d.c. voltage to an alternating voltage for application across a load having an input and return referenced to said d.c. voltage, comprising:
  a first transistor having emitter, collector and base terminals;
  a second transistor having emitter, collector and base terminals, said first transistor collector terminal being connected to said second transistor collector terminal and said load input being connected to said collector connection point;
  an upper supply voltage connected to said first transistor emitter terminal;
  a supply voltage lower than said upper supply voltage, said lower supply voltage connected to said second transistor emitter terminal;
  a first drive signal connected to said first transistor base terminal, said first drive signal having two output voltages comprising said upper supply voltage and an upper reference voltage referenced to and below said upper supply voltage, said first drive signal upper supply voltage causing said first transistor to not conduct, said first drive signal upper reference voltage causing said first transistor to conduct;
  a second drive signal connected to said second transistor base terminal, said second drive signal having two output voltages comprising said lower supply voltage and a lower reference voltage referenced to and above said lower supply voltage, said second drive signal lower supply voltage causing said second transistor to not conduct, said second drive signal lower reference voltage causing said second transistor to conduct; and
  means for controlling said first and second drive signal output voltages so that said first and second transistors will sequentially conduct and not conduct said controlling means further preventing conduction of said first and second transistors simultaneously.

8. The inverter of claim 7 in which said first transistor is a pnp power darlington transistor, said second transistor is a npn power darlington transistor and said load return is referenced to a voltage potential equal to or lower than said upper supply voltage but not lower than said lower supply voltage.

9. The inverter of claim 7 in which said control means comprises a square wave clock pulse, said clock pulse being altered to a first voltage vs. time profile for controlling said first drive signal output and a second voltage vs. time profile for controlling said second drive signal output.

10. The inverter of claim 9 in which:
  said first voltage vs. time profile comprises said clock pulse having unaltered rise characteristics and delayed decay characteristics, said first voltage when above a predetermined voltage level causing a first switch means to apply said upper supply voltage to said first drive signal thereby causing said first transistor to not conduct, said first voltage when not above said predetermined voltage level causing said first switch means to apply said upper reference voltage to said first drive signal thereby causing said first transistor to conduct; and
  said second voltage vs. time profile comprises said clock pulse having delayed rise characteristics and unaltered decay characteristics, said second voltage when above a predetermined voltage level causing a second switch means to apply said lower reference voltage to said second drive signal thereby causing said second transistor to conduct, said first voltage level when not above said predetermined voltage level causing said second switch means to apply said lower supply reference voltage to said second drive signal thereby causing said second transistor not to conduct.

11. The inverter of claim 7 further comprising a power supply having said upper supply voltage, upper reference voltage, lower reference voltage and lower supply voltage as outputs.

12. The inverter of claim 7 in which said power supply upper reference voltage is a first predetermined number of volts below said upper supply voltage and said lower reference voltage is a second predetermined number of volts above said lower supply voltage.

13. A method for converting a d.c. voltage to an alternating voltage for application across a load having an input and return referenced to said d.c. voltage, the steps comprising:
  applying an upper supply voltage to a first transistor emitter terminal;
  applying a supply voltage lower than said upper supply voltage to a second transistor emitter terminal said first and second transistor collector terminals being connected to said load input;
  controlling the conduction of said first transistor by a first drive signal connected to said first transistor base terminal, said first drive signal having two output voltages comprising said upper supply voltage and an upper reference voltage referenced to and below said upper supply voltage, said first drive signal upper supply voltage causing said first transistor to not conduct, said first drive signal upper reference voltage causing said first transistor to conduct;
  controlling the conduction of said second transistor by a second drive signal connected to said second transistor base terminal, said second transistor drive signal having two output voltages comprising said lower supply voltage and a lower reference voltage referenced to and above said lower supply voltage, said second drive signal lower supply voltage causing said second transistor to not conduct, said second drive signal lower reference voltage causing said second transistor to conduct; and
  phasing said first and second drive signals each with the other so that said first transistor will conduct only while said second transistor is not conducting and said second transistor will conduct only while said first transistor is not conducting.

14. An apparatus having at least one inverter for converting a d.c. voltage difference to an alternating voltage for application to a load having an input and return, comprising:
   a first pnp type transistor having emitter, collector and base terminals;
   a second npn type transistor having emitter, collector and base terminals, said first transistor collector terminal being connected to said second transistor collector terminal and said load input being connected to said collector connection point;
   a d.c. power supply having an upper voltage output and a lower voltage output, said upper voltage output connected to said first transistor emitter and said lower voltage output connected to said second transistor emitter, said load return being referenced to a voltage potential equal to or lower than said upper supply voltage but not lower than said lower supply voltage;
   means for alternately applying said upper voltage output and said lower voltage output at said first and second transistor emitters respectively to said collector connection point, and for preventing a simultaneous conduction of said first and second transistors, said applying and preventing means comprising means for controlling the conduction of said first and second transistors through their respective base terminals, said controlling means including:
   means for applying to said first transistor base terminal a blocking voltage equal to said upper voltage output and an unblocking voltage which is a predetermined voltage differential below said upper voltage output, said blocking and unblocking voltages causing said first transistor to not conduct and conduct, respectively, and
   means for applying to said second transistor base terminal a blocking voltage equal to said lower voltage output and an unblocking voltage which is a predetermined voltage differential above said lower voltage output, said blocking and unblocking voltages causing said second transistor to not conduct and conduct, respectively.

15. The apparatus of claim 14 in which said d.c. power supply further comprises a first voltage regulator connected across said upper voltage and lower voltage outputs, said first voltage regulator providing said first transistor unblocking voltage, and a second voltage regulator connected across said upper voltage and lower voltage outputs, said second voltage regulator providing said second transistor unblocking voltage.

16. The apparatus of claim 15 in which said first voltage regulator comprises a first zener diode and current limiting impedance in series, said first zener diode current blocking terminal being connected to said upper voltage output, said first transistor unblocking voltage being a voltage at the other terminal of said first zener diode when said first zener diode breakdown voltage is exceeded, and said second voltage regulator comprises a second zener diode and current limiting impedance in series, said second zener diode current blocking terminal being connected to said second current limiting impedance, said second transistor unblocking voltage being a voltage at said second zener diode current blocking terminal when said second zener diode breakdown voltage is exceeded.

17. An inverter for converting a d.c. voltage difference to an alternating voltage for application to a load having an input and return referenced to a d.c. voltage, comprising:
   a first transistor having emitter, collector and base terminals;
   a second transistor having emitter, collector and base terminals, said first transistor collector terminal being connected to said second transistor collector terminal and said load input being connected to said collector connection point;
   means for providing an upper supply voltage to said first transistor emitter terminal and a supply voltage lower than said upper supply voltage to said second transistor emitter terminal;
   means for providing a first drive signal to said first transistor base terminal, said first drive signal having two output voltages comprising said upper supply voltage and an upper reference voltage referenced to and below said upper supply voltage, said first drive signal upper supply voltage causing said first transistor to not conduct, said first drive signal upper reference voltage causing said first transistor to conduct;
   means for providing a second drive signal to said second transistor base terminal, said second drive signal having two output voltages comprising said lower supply voltage and a lower reference voltage referenced to and above said lower supply voltage, said second drive signal lower supply voltage causing said second transistor to not conduct, said second drive signal lower reference voltage causing said second transistor to conduct; and
   means for controlling said first and second drive signal output voltages so that said first and second transistors will sequentially conduct and not conduct, said controlling means further preventing conduction of said first and second transistors simultaneously.

18. The inverter of claim 17 in which said first transistor is a pnp power darlington transistor, said second transistor is a npn power darlington transistor and said load return is referenced to a voltage potential equal to or lower than said upper supply voltage but not lower than said lower supply voltage.

19. The inverter of claim 17 in which said controller means receives a square wave clock pulse, said clock pulse being altered to a first voltage vs. time profile for controlling said first drive signal output and a second voltage vs. time profile for controlling said second drive signal output.

20. The inverter of claim 17 wherein said supply voltage providing means further provides said upper reference voltage and said lower reference voltage, and comprises a power supply having said upper supply voltage, upper reference voltage, lower reference voltage and lower supply voltage as outputs.

21. The inverter of claim 17 in which said power supply upper reference voltage is a first predetermined number of volts below said upper supply voltage and said lower reference voltage is a second predetermined number of volts above said lower supply voltage.

22. A method for converting a d.c. voltage difference to an alternating voltage for application to a load having an input and return referenced to a d.c. voltage, the steps comprising;

applying an upper supply voltage to a first transistor emitter terminal;

applying a supply voltage lower than said upper supply voltage to a second transistor emitter terminal, said first and second transistor collector terminals being connected to said load input;

controlling the conduction of said first transistor by a first drive signal connected to said first transistor base terminal, said first drive signal having two output voltages comprising said upper supply voltage and an upper reference voltage referenced to and below said upper supply voltage, said first drive signal upper supply voltage causing said first transistor to not conduct, said first drive signal upper reference voltage causing said first transistor to conduct;

controlling the conduction of said second transistor by a second drive signal connected to said second transistor base terminal, said second transistor drive signal having two output voltages comprising said lower supply voltage and a lower reference voltage referenced to and above said lower supply voltage, said second drive signal lower supply voltage causing said second transistor to not conduct, said second drive signal lower reference voltage causing said second transistor to conduct; and phasing said first and second drive signals each with the other so that said first transistor will conduct only while said second transistor is not conducting and said second transistor will conduct only while said first transistor is not conducting.

23. An apparatus having at least one inverter for converting a d.c. voltage difference to an alternating voltage for application to a load having an input and return, comprising:

a first pnp type transistor having emitter, collector and base terminals;

a second npn type transistor having emitter, collector and base terminals, said first transistor collector terminal being connected to said second transistor collector terminal and said load input being connected to said collector connection point;

a d.c. power supply having an upper voltage output and a lower voltage output, said upper voltage output connected to said first transistor emitter and said lower voltage output connected to said second transistor emitter, said load return being referenced to a voltage potential equal to or lower than said upper supply voltage but not lower than said lower supply voltage;

means for alternately applying said upper voltage output and said lower voltage output at said first and second transistor emitters respectively to said collector connection point, and for preventing a simultaneous conduction of said first and second transistors, said applying and preventing means comprising means for controlling the conduction of said first and second transistors through their respective base terminals in response to an externally generated repetitive square wave clock pulse having a leading edge and trailing edge.

24. The apparatus of claim 23 in which said controlling means comprises means for delaying the conduction of said first transistor for a first predetermined time after cessation of conduction of said second transistor and for delaying the conduction of said second transistor for a second predetermined time after cessation of conduction of said first transistor, said delaying means including:

a first RC network having a time constant at least in part determining said first predetermined time, said square wave trailing edge decay characteristics being altered by said first RC network and said square wave leading edge rise characteristics being unaltered by said first RC network, said first transistor conducting during a time in which said so altered square wave is below a predetermined voltage level; and a second RC network having a time constant at least in part determining said second predetermined time, said square wave leading edge rise characteristics being altered by said second RC network and said square wave trailing edge decay characteristics being unaltered by said second RC network, said second transistor conducting during a time in which said so altered square wave is above a predetermined voltage level.

25. The apparatus of claim 23 in which said at least one inverter comprises three inverters, each being driven by a separate repetitive square wave clock pulse being phase separated from the other two by about 120 degrees.

* * * * *